US012125362B2

(12) United States Patent
Luu et al.

(10) Patent No.: US 12,125,362 B2
(45) Date of Patent: Oct. 22, 2024

(54) AUGMENTED REALITY RESCUE TAGGING

(71) Applicant: AT&T Intellectual Property I, L.P., Atlanta, GA (US)

(72) Inventors: Adrianne Luu, Atlanta, GA (US); Robert Moton, Jr., Alpharetta, GA (US); Ryan Schaub, Berkeley Lake, GA (US); Timothy Knezevich, Mentor, OH (US); Barrett Kreiner, Woodstock, GA (US); Wei Wang, Harrison, NJ (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 113 days.

(21) Appl. No.: 17/929,452

(22) Filed: Sep. 2, 2022

(65) Prior Publication Data
US 2024/0078890 A1  Mar. 7, 2024

(51) Int. Cl.
*G08B 21/18* (2006.01)
*G06T 19/00* (2011.01)
*G08B 21/02* (2006.01)
*H04W 4/029* (2018.01)
*H04W 4/90* (2018.01)

(52) U.S. Cl.
CPC .......... *G08B 21/182* (2013.01); *G06T 19/006* (2013.01); *G08B 21/02* (2013.01); *H04W 4/029* (2018.02); *H04W 4/90* (2018.02)

(58) Field of Classification Search
CPC ..... G08B 21/182; G08B 21/02; H04W 4/029; H04W 4/90; G06T 19/006
USPC ....................................................... 340/573.1
See application file for complete search history.

(56) References Cited

U.S. PATENT DOCUMENTS

| 10,026,279 | B1* | 7/2018 | Beller | G08B 25/10 |
| 10,777,051 | B1* | 9/2020 | Kumar | B64D 47/02 |
| 11,024,105 | B1* | 6/2021 | Brand | G06K 7/10366 |
| 11,356,806 | B2* | 6/2022 | Juwvipart | H04W 4/029 |
| 2009/0327889 | A1* | 12/2009 | Jeong | G06F 16/954 |
| | | | | 715/706 |
| 2011/0130636 | A1* | 6/2011 | Daniel | H04Q 9/00 |
| | | | | 709/201 |

(Continued)

*Primary Examiner* — Zhen Y Wu
(74) *Attorney, Agent, or Firm* — Guntin & Gust, PLC; Dana B. LeMoine

(57) ABSTRACT

The disclosed technology is directed towards associating a rescue tag with a victim in need of rescue, in which the rescue tag collects condition (biological state) data associated with the victim and provides a location of the rescue tag. The location data is maintained in association with the condition data. A responder makes a request to output the condition data, and in response, the responder's device is presented with an augmented reality display that shows the victim condition data relative to the location data. Multiple victims can be efficiently triaged, with more urgent victims highlighted via augmented reality for more urgent treatment. Filtering as requested by a responder can present augmented reality display for only a subset of the victims. Also described is the use of an aerial vehicle to assist the responders and/or a command center; the aerial vehicle can act as an edge node for efficient communication.

20 Claims, 15 Drawing Sheets

(56) References Cited

U.S. PATENT DOCUMENTS

| | | | |
|---|---|---|---|
| 2013/0049956 A1* | 2/2013 | Freeman | G08B 25/016 |
| | | | 368/107 |
| 2013/0147621 A1* | 6/2013 | Kwong | A62B 3/00 |
| | | | 340/521 |
| 2015/0288469 A1* | 10/2015 | Shoemaker | H04W 4/90 |
| | | | 455/3.01 |
| 2016/0142894 A1* | 5/2016 | Papakonstantinou | G16H 40/67 |
| | | | 455/404.1 |
| 2018/0040229 A1* | 2/2018 | Munusamy | H04W 4/80 |
| 2019/0282324 A1* | 9/2019 | Freeman | A61H 31/005 |
| 2020/0167569 A1* | 5/2020 | Simpkinson | G06F 18/2415 |
| 2020/0273255 A1* | 8/2020 | Godin | G09B 5/02 |
| 2021/0006961 A1* | 1/2021 | King-Berkman | H04W 76/50 |
| 2021/0200776 A1* | 7/2021 | Pounds | G06F 16/2477 |
| 2022/0044537 A1* | 2/2022 | Lai | G06F 3/011 |
| 2023/0097676 A1* | 3/2023 | Yap | G05D 1/0038 |
| | | | 701/2 |
| 2023/0123055 A1* | 4/2023 | Shaker | A61B 5/332 |
| | | | 600/509 |

* cited by examiner

AUGMENTED REALITY RESCUE TAGGING

TECHNICAL FIELD

The subject application relates to the presentation of an emergency scene augmented with biological data or the like, and related embodiments.

BACKGROUND

First responders, when responding to a scene of an emergency, such as one involving multiple victims, may not readily be able to understand the current conditions and/or trending conditions of the victims on the scene. As a possible result, triaging which victims need more urgent assistance than others is not efficiently known. Further, even for a single victim emergency, valuable time may be lost in diagnosing the victim's condition before administration of appropriate rescue procedures can begin.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
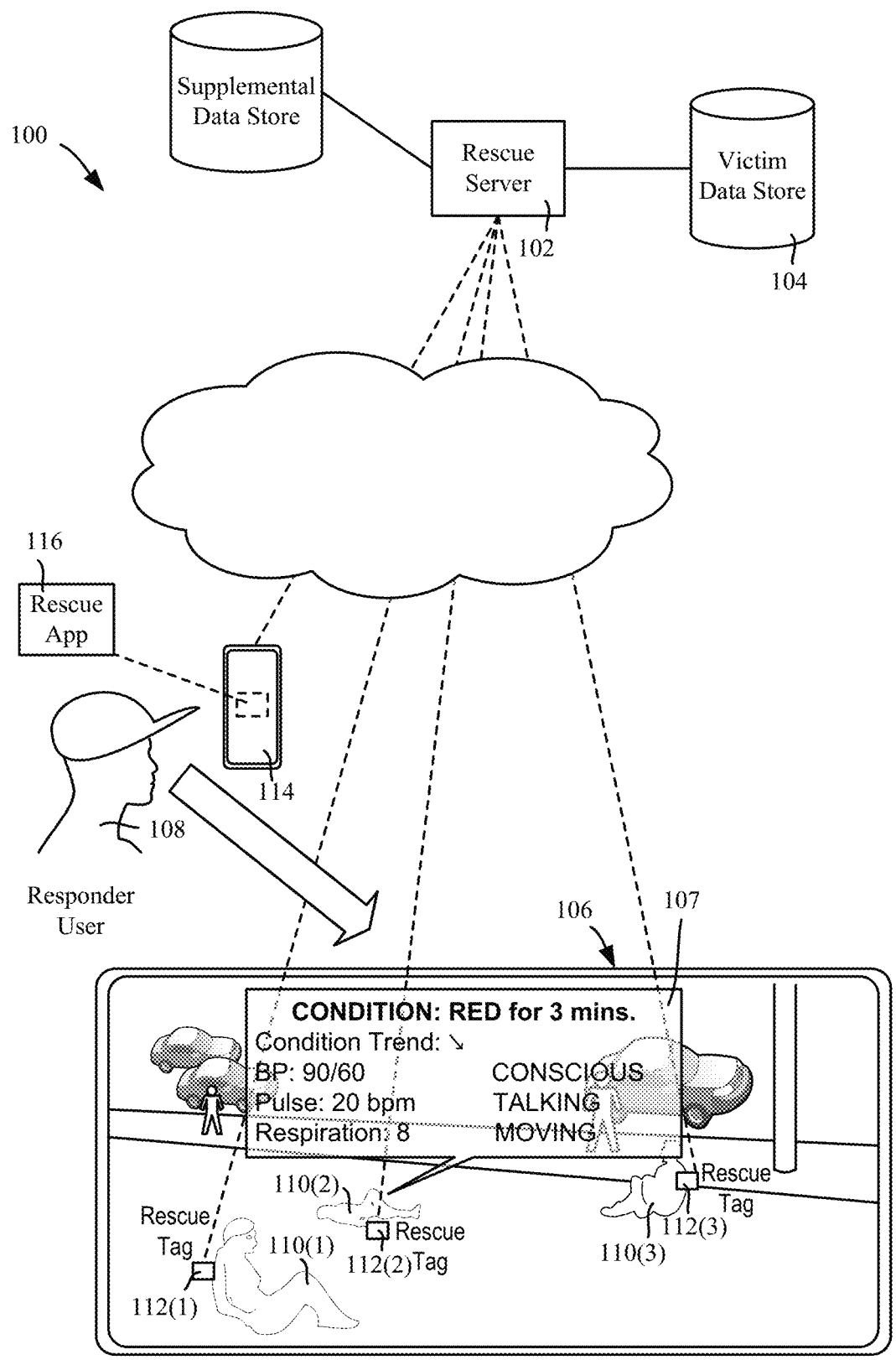
FIG. 1 is a block diagram of an example system and example representation of an augmented reality scene environment for presenting a responder with victim data collected via rescue tags, in accordance with various aspects and embodiments of the subject disclosure.

The technology described herein is generally directed towards presenting data describing the biological state of one or more medical patients via augmented reality. To this end, medical patients are associated with a rescue tag, which can be a physical sensor attached to or otherwise (e.g., able to remotely sense) the patient in some way, or a device of the medical patient, e.g., a wearable device, a smartphone, and so on.

The biological state data can be presented for patients that are within a field of view of a user (e.g., a responding entity), as well as present within an obstructed view. Note that one example embodiment described herein is directed towards a first responder at an emergency scene; however, the technology described herein may be applied in other exemplary cases.

In such an example, via the technology described herein, first responders, when responding to a scene, are readily able to understand the current medical condition and/or trending medical condition of the victims on scene. The responder is efficiently presented with data that describes the condition of each victim, including, for example, before the responder physically arrives on the scene. The responder may also communicate with each victim as needed, (to the extent possible), such as via the rescue tag or device coupled thereto, even if not within a nearby physical audible range of the victim. The data collected during the period of victim assessment is recorded and is updated dynamically, with alerts presented as needed if the conditions change. The data also can be made available to other responders, medical personnel or the like later in the chain of care, such as those at a hospital.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth. Olfactory output as well as taste output and/or tactile output can also be part of a promotional presentation as described herein.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows an example system 100 comprising a rescue server 102 coupled to a victim data store (e.g., database) 104. Also shown is an augmented reality view (a scene) 106, with an augmented reality overlay 107, presented to a responder user 108, showing a number of victims in need of assistance, with each victim associated with a rescue tag. Note that although not explicitly depicted in FIG. 1, the augmented reality overlay 107 can be color coded or otherwise highlighted (e.g., flashing, brighter, bordered, animated and/or the like) to highlight something about the corresponding victim, e.g., colored red for condition RED. Note that it is feasible for the responder to be a non-human responding entity, at least at first; for example, a robot drone or the like can be the first responder to arrive, such as to assess the victim.

In the example of FIG. 1, three such victims 110(1)-110(3) are depicted with respective rescue tags 112(1)-112(3), however it is understood that the technology described herein provides benefits to responder(s) and victim(s) for as little as one victim up to any practical number for an emergency event. Note that the terms "Rescue Tag" or the like (e.g., "RT") or a flashing, colored block or the like can be made visible via augmented reality so that the responder user knows each victim's tag status. Thus, each victim may be presented with a rescue tag, such as a wearable device that collects a number of biometric sensor readings that track the health status of the victim. The rescue tags may be equipped with wireless communication capability as well as local data storage. The rescue tags are equipped with location-aware capabilities, such as GPS. The rescue tags 112(1)-112(3) are thus coupled to the rescue server 102, which knows their respective location data and any respective other data (e.g., as described herein) collected by a respective rescue tag.

In general, the rescue tags 112(1)-112(3) may be applied in a number of ways such as via a bracelet, adhesive, or other techniques. In one embodiment, a first responder may apply a rescue tag to one or more victims at an emergency scene. Note that any first responder, even one who is not medically trained, can apply a rescue tag to such a victim; for example, police officers may first arrive on the scene, and possess rescue tags as part of their equipment. A drone, robot or other quickly responding vehicle (e.g., a helicopter) can supply rescue tags to bystanders and/or lesser-injured victims, who in turn can apply the rescue tags to victims in need of assistance; (it is also feasible for a robot or the like to apply rescue tags to victims).

Figure 2:
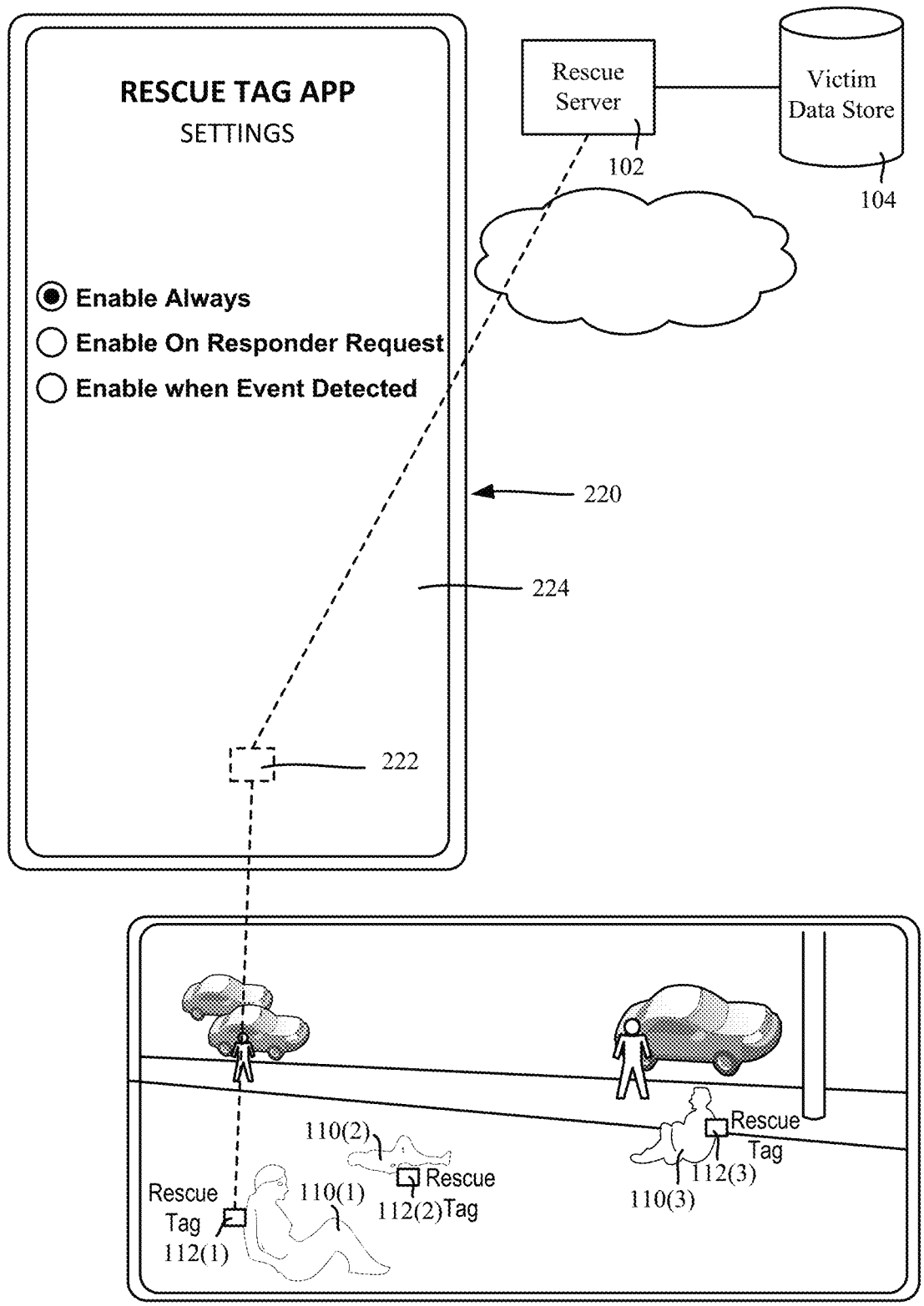
FIG. 2 is a block diagram of an example system including an example rescue tag application program coupled to a victim to act as a rescue tag, in accordance with various aspects and embodiments of the subject disclosure.

A rescue tag, e.g., the rescue tag 112(1), may be associated with the user in advance; for example, a user device such as a fitness watch, an application program on a smartphone (e.g., as shown in FIG. 2 via the smartphone 220, application program (app) 222 and application program interface 224), an alert necklace, and so forth can be already configured to sense and report (at least in part) certain medical data of a user. Indeed, alternatively or in addition to a rescue tag subsequently applied to a victim, a device that the victim already has maybe used entirely, or partially as a rescue tag. For example, if the victim has a smartwatch or a smartphone, its capabilities may be used to sense and collect some or all available biometric readings and perform at least some of the other capabilities of a rescue tag. Thus, a rescue tag application program 222 may be preloaded on the victim's device prior to the occurrence of the emergency event. Alternatively, the victim's device's operating system may be configured so as to allow the rescue tag application program to be pushed to the victim's device and enabled by the first responder or the rescue server.

In any event, a rescue tag is associated with (coupled to) the user in some way, whether via direct contact, remote sensing or a combination of both. The rescue tag may monitor vital conditions such as including, but not limited to, blood pressure, body temperature, perspiration levels, electrocardiogram (EKG/ECG), pulse, pulse oximeter readings, respiration, and others. The rescue tag also may monitor and collect data related to the victim's location, and ambient conditions such as temperature, moisture levels, noise levels, air quality levels, ambient light levels, radiation levels, and others. Certain environmental data can be indirectly obtained via virtual sensing, e.g., the rescue tag itself may not sense external ambient temperature (which can be inaccurate if the tag is coupled to sense body temperature), but the past/current/predicted external temperature can be obtained remotely based on the tag's location. The tag may also have a camera, microphone, and speaker that may be used for capturing audio, video, images, and for audio and video communication.

A user, e.g., the responder user 108, such as a medically trained responder/paramedic/emergency medical technician or the like, can be equipped with an augmented reality viewing device, device speakers, separate speakers such as earbuds, and/or microphones. In the example of FIG. 1, the augmented reality viewing device is represented as a smartphone 114 of the responder user 108. The device and microphone(s), via a rescue application (app) program 116, is able to communicate with the rescue server 102, which is also in communication with the victim data store 104. The rescue server 102 may be used to manage and present the flow of data and other communications, including monitoring changes in the victim's data or responding to user requests for presentation of data. The rescue server 102 also can be coupled to other data stores; for example, a separate supplemental data store 118 is shown in the example of FIG. 1, and may maintain pre-existing condition data/health information for the victim, once the victim's identity is known, such as any allergies, disabilities, other known conditions (e.g., has a pacemaker), and the like.

Figure 3:
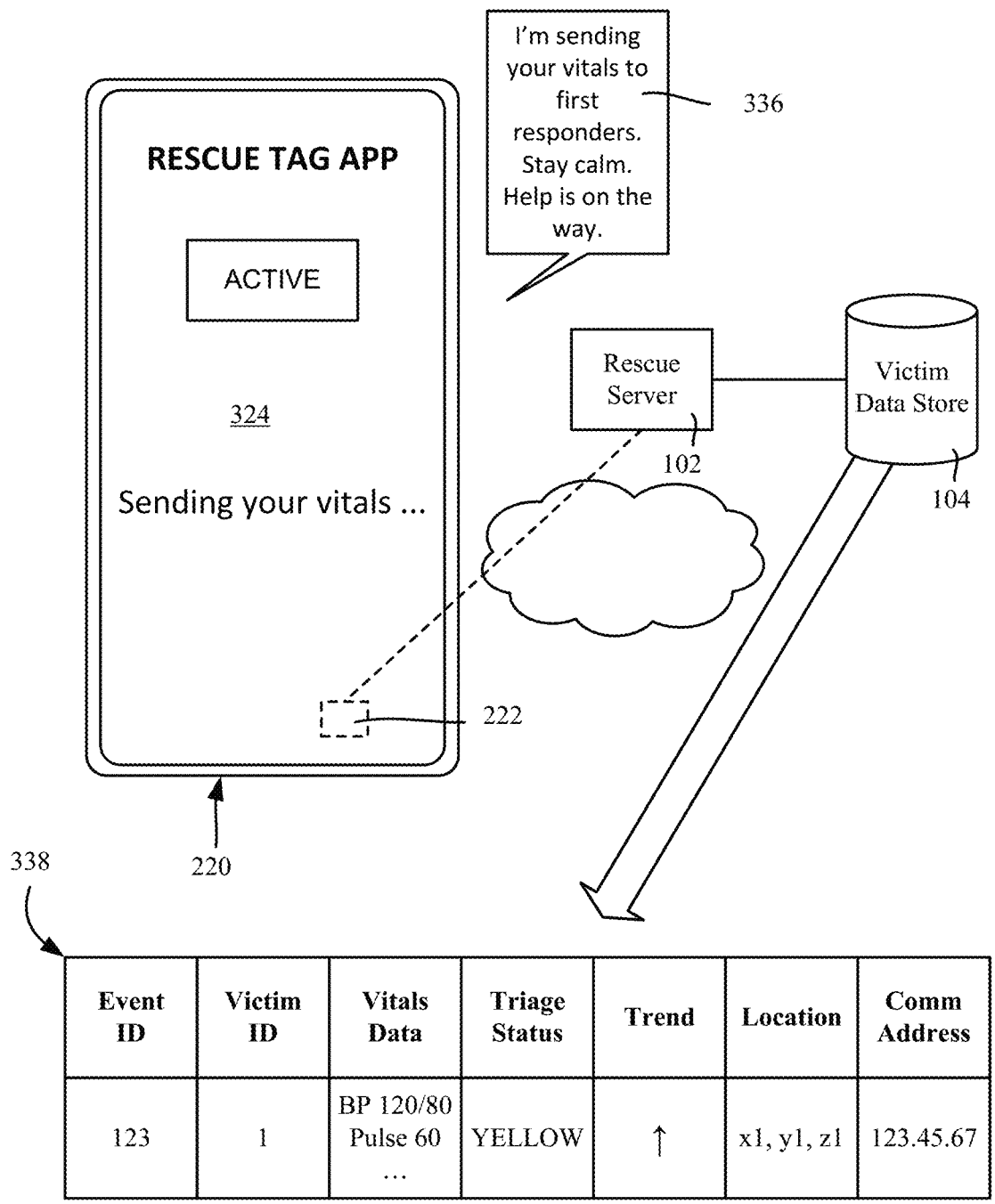
FIG. 3 is a block diagram of an example system, example rescue tag and example data structure for collecting, maintaining and presenting a responder with victim data, in accordance with various aspects and embodiments of the subject disclosure.

It is feasible to enable the rescue tag application program prior to any first responder arrival. For example, as shown in the example of FIGS. 2 and 3, if one or more victim(s) (e.g., the victim 110(1)) are equipped with their own devices, the rescue tag application program(s) (e.g., the rescue tag application program 222) on their device(s) (e.g., the device 220) may receive data from sensors or other application programs on the device(s) to detect the occurrence of an emergency event. For instance, an emergency event may be detected such as an abnormal EKG event, a fall, a car accident and so forth. Likewise the victim (or another person such as a witness or passerby) may also expressly indicate the occurrence of an event, such as by placing a 911 call or invoking an emergency distress button on a user device or the rescue application program. In such cases, the rescue tag application program may declare the start of an event and activate data collection and communication capabilities before a first responder arrives. The victim's data may be sent to the rescue server 102 and victim data store 104, where the data is associated with a rescue event identifier (ID) as shown via the example data structure 338 maintained in the victim data store 104, e.g., one record per victim. The rescue tag application program may begin to inform the victim of his or her rescue status via visual "Sending your vitals . . . ") and/or audio presentation (block 336).

Figure 4:
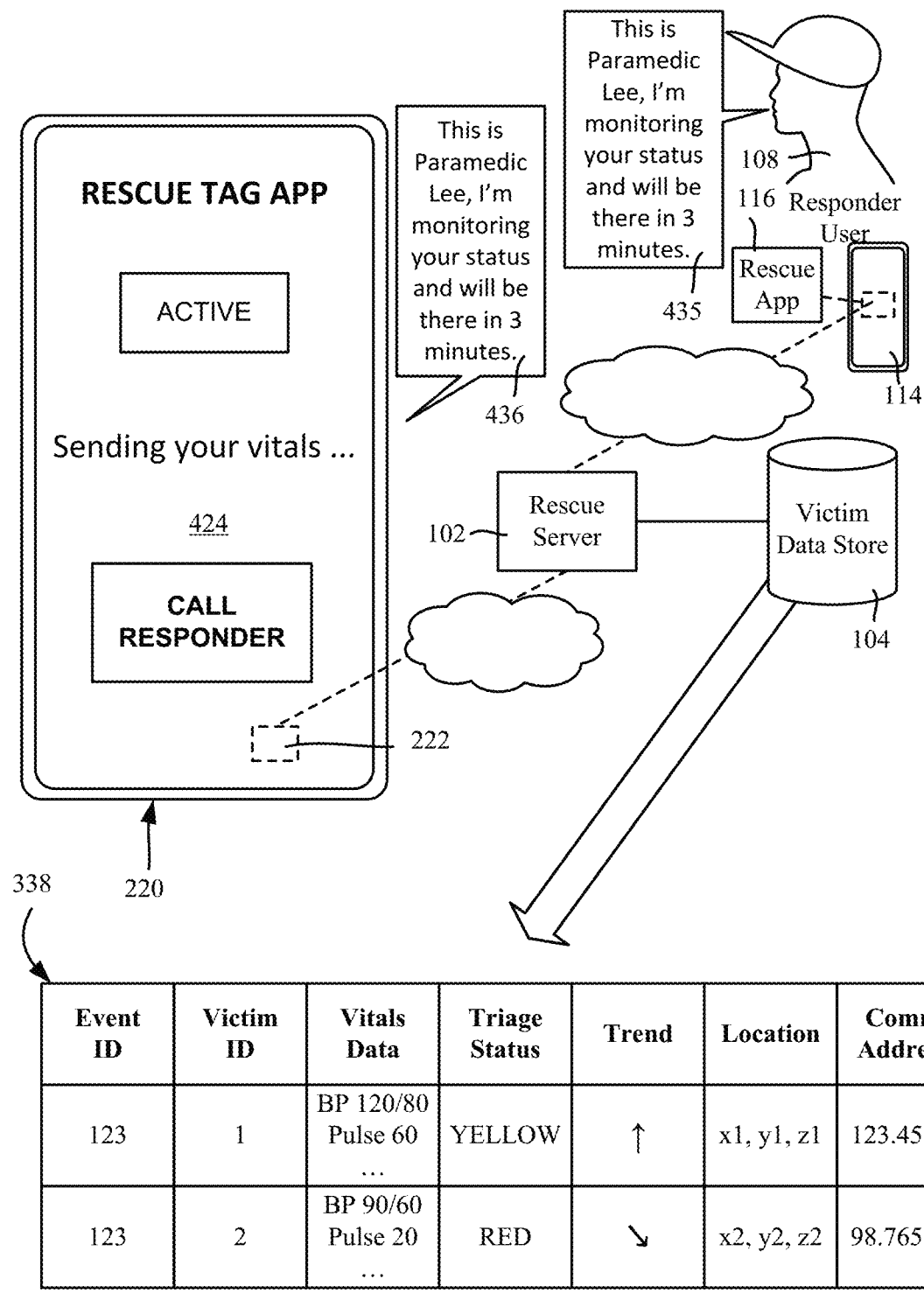
FIG. 4 is a block diagram of an example system, example rescue tag and example data structure for by which a responder can communicate with a victim, in accordance with various aspects and embodiments of the subject disclosure.

One or more first responders may be assigned to the rescue event. Upon this assignment, the responder(s) gain access to the victim data for the event, e.g., via the data structure 338 of the victim data store 104, including a communication address for the victim's device, so that the responder user may communicate with the victim before arriving on scene. As shown in FIG. 4, the responder user therefore may communicate (blocks 435 and 436) with the victim in advance of arrival, be presented with the victim's vitals and other sensor data, and may assign a preliminary triage code to the victim's data prior to arrival. In the event that a victim is unable to communicate, the victim data is available to assist in determining action to take with respect to that victim. As set forth herein, the victim data can include data obtained from other sources, e.g., known pre-existing condition data regarding the victim. Note that in FIG. 4, the data structure 338 in the data store has been updated with the data for a second victim, victim ID 2; the data structure 338 is also updated whenever any victim conditions change.

Note that although not explicitly shown in FIG. 4, other information may be maintained in the data store, e.g., responder status ("on way," "arrived," with victim, and so forth), as well as other data (e.g., "allergy-related shock, administered antihistamine").

Thus, the responders may feed updates and the like back into the system, possibly directly or indirectly via communications to a command center. For example, assigned responders or the command center can plan out, on their way to the scene, which responder will take care of which victim(s); such information once input into the system can then show such planning, including via the responder's application programs. Further, the actions taken by the responders at the scene can be updated on the application programs, and updated in the data store; e.g., victim 1 is taken care of and will be sent home, victim 2 is scheduled to be picked up by an ambulance to the hospital one in five minutes, victim 3 has already been picked up, and so forth. Such feedback and updating will reduce duplicated actions and eliminate possible confusion by the responders.

Figure 5:
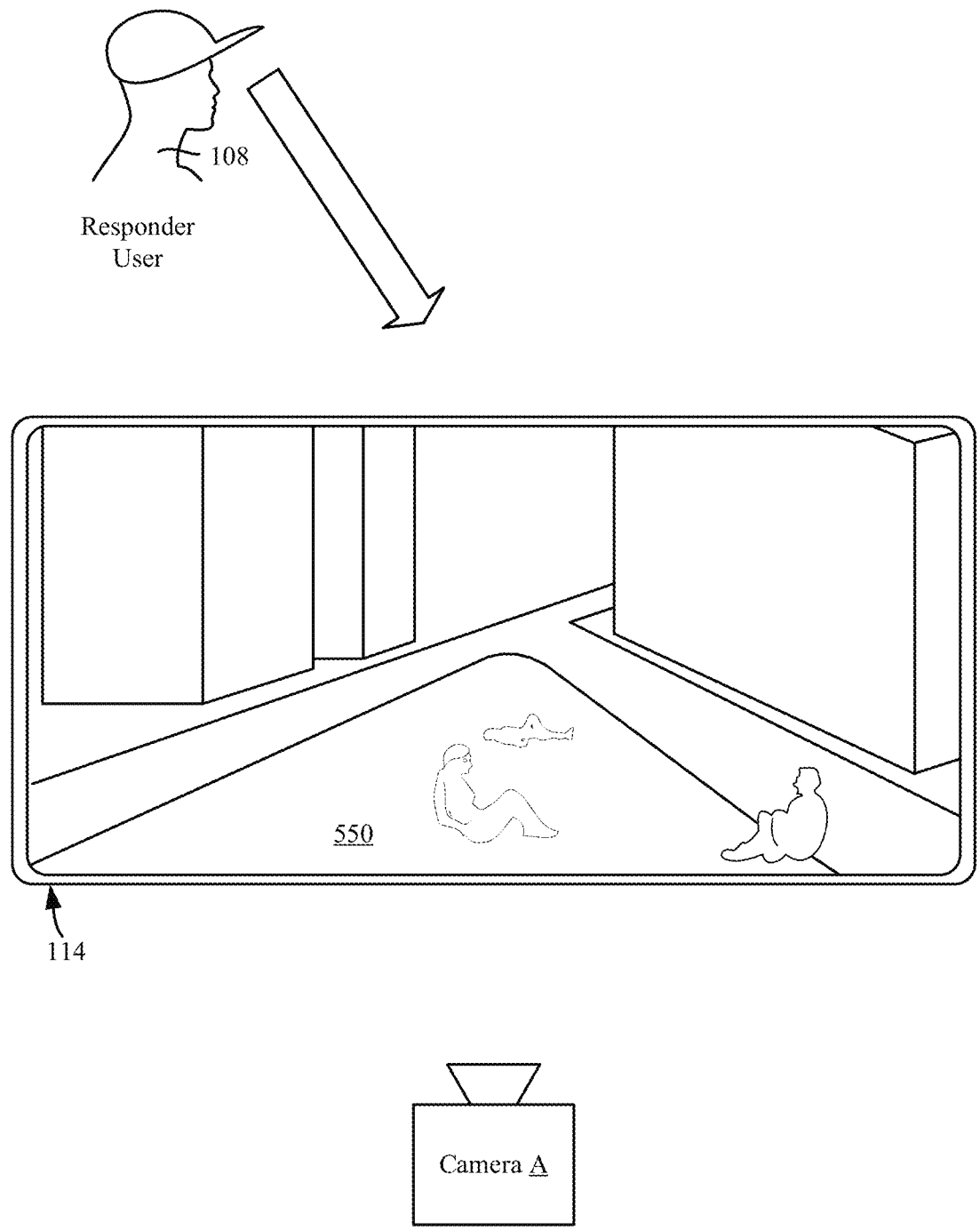
FIG. 5 is an example representation of providing a responder with a scene captured by an external camera, in accordance with various aspects and embodiments of the subject disclosure.

The responder also may request or be presented with access to cameras or other sensors that are nearby the scene. For example, the request (explicit or implicit) is processed by the rescue server 102, using the GPS of the user's device to identify one or more cameras that are within range of the device and oriented in the direction of the device. For example, FIG. 5 shows a live stream 550 from a camera A that the responder user 108 is able to view upon request; (when available, a prerecorded view also may be requested and presented, with a timestamp or the like showing what happened at what time). By presenting this visual view 550 of the victim's situation to the responder, the responder may determine if there is another imminent external threat to the victim that might adjust their triage level—such as a downed power line nearby. Note that the external camera's view may be augmented with virtual reality data.

Figure 6:
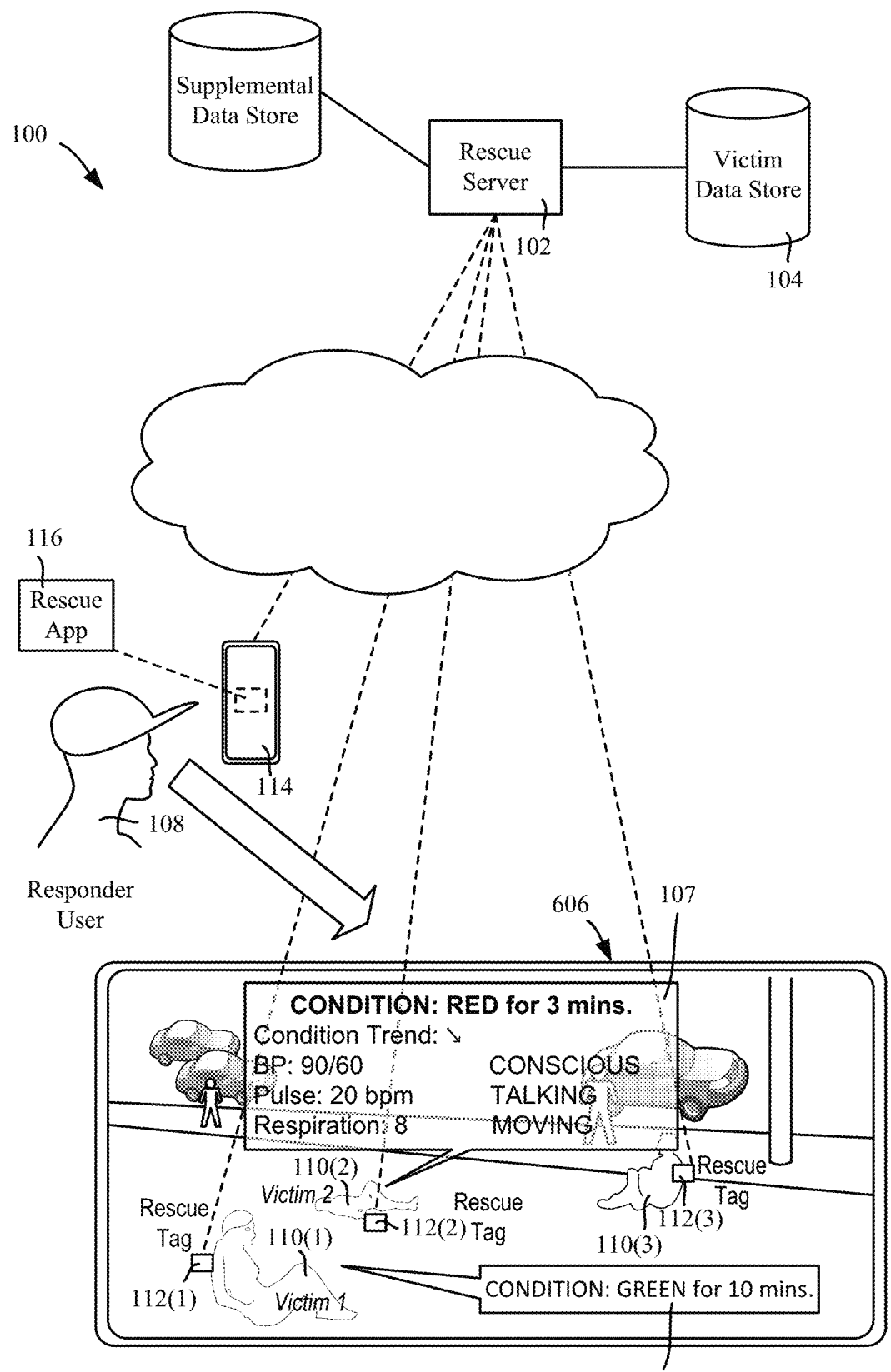
FIG. 6 is a block diagram of an example system and example representation of an augmented reality scene environment for presenting a responder with data of multiple victims, in accordance with various aspects and embodiments of the subject disclosure.

Upon arrival on the scene, the responder may first need to identify which victims have been pre-triaged via the rescue tag, as previously described, and which have not been. Those that have not been may be equipped with a physical rescue tag by the responder on scene. For example, FIG. 6 shows, via the augmented reality overlay 107 that the victim 110(2) (now also identified via augmented reality text as "Victim 2") has been triaged, as has the victim 110(1) via augmented reality overlay 6677 that (now also identified via augmented reality text as "Victim 1"). Note that although not explicitly depicted in FIG. 6, the augmented reality overlays 107 and 667 can be color coded or otherwise highlighted, e.g., colored red for condition RED and green for condition GREEN.

Thus, in one embodiment generally represented in the example view (scene) 606 of FIG. 6, each responder may use their microphone to utter an augmented reality display command to the rescue server; such a command can be similarly invoked via other suitable interactive interface. The rescue server may associate the location of the responder with the victim database to identify victims at the scene where the responder is located. The pre-triaged victims and their data may be presented via an augmented reality display to the responder using known augmented reality techniques based on the responder's location, field of view, and relationship to the location of the victims' devices that are serving as rescue tags, e.g., running an instance of the rescue tag application program. Once physical rescue tags are applied to the victims that were not able to be pre-triaged, all such victims are equipped for continual data display and communication via the augmented reality interface with the responder. The augmented reality overlay display area may be optimized to present more area for display for certain victim(s), e.g., more urgent victims take precedence over less urgent ones. An overlay corresponding to a more urgent victim can also block part (or all) of another overlay with which it overlaps.

Figure 7:
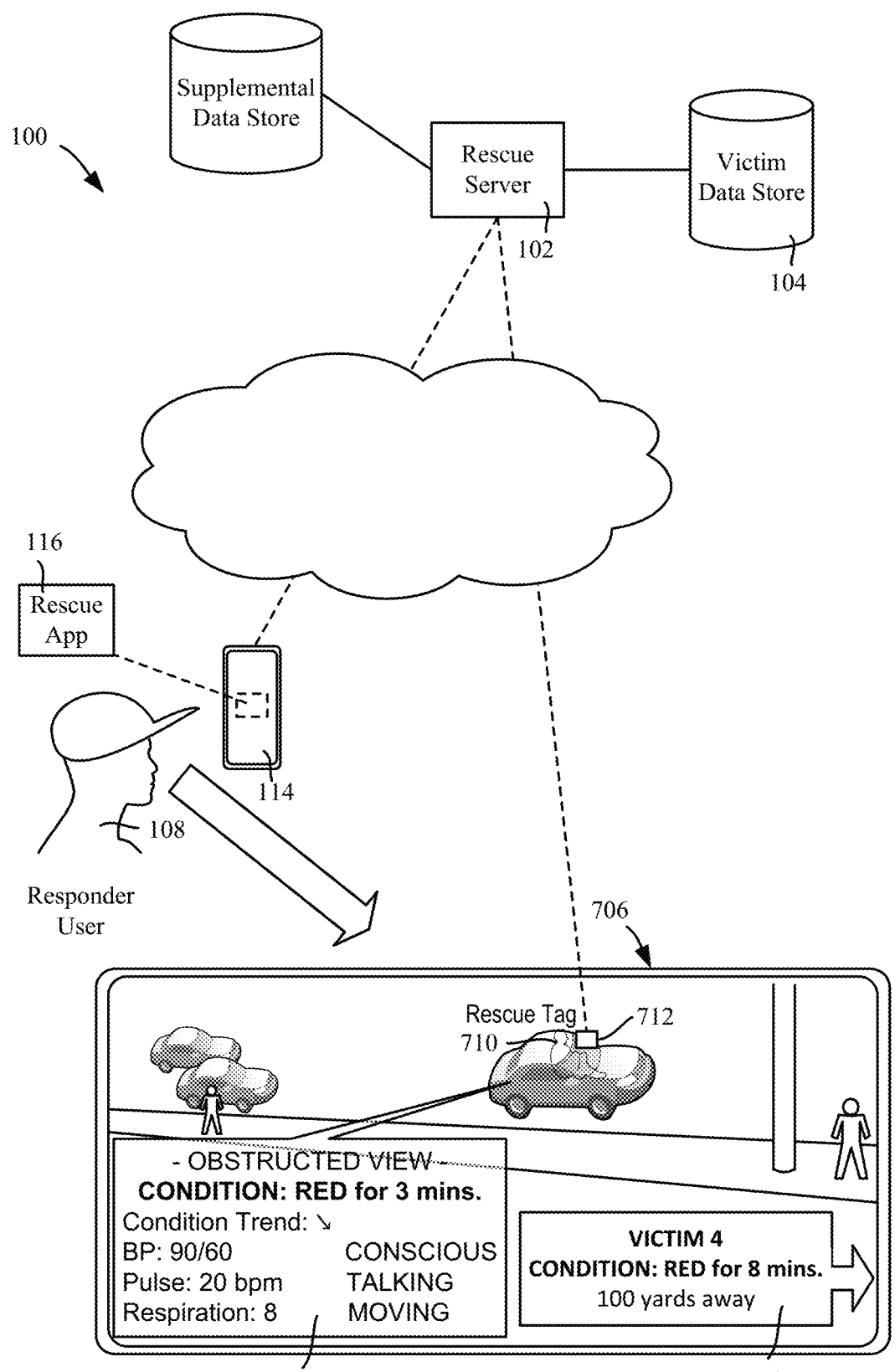
FIG. 7 is a block diagram of an example system and example representation of an augmented reality scene environment for presenting a responder with data of multiple victims and providing guidance to the responder, in which the victims are not in the field of view of the responder, in accordance with various aspects and embodiments of the subject disclosure.

Some victims may be nearby the responder but not immediately visible. These victims may be obstructed from view or not within the responder's current line of sight. For example, in FIG. 7 there is one victim 710 with rescue tag 712 behind (or within) a vehicle. Another victim, is nearby, but not visible within the user responder device's augmented reality view 706. In these situations, the location of the victim is correlated by the rescue server with the field of view of the responder, whereby the resulting augmented reality display may present directionally informative assistance to the responder. This can be visible data as shown via the overlay 707(a) of FIG. 7, and/or audible data, e.g., "there is a victim inside the car to your right, condition red." The other victim is not visible, however the overlay 707(a) includes data that indicates the location and current biological status ("CONDITION: RED for 8 mins.") of the other victim.

Figure 8:
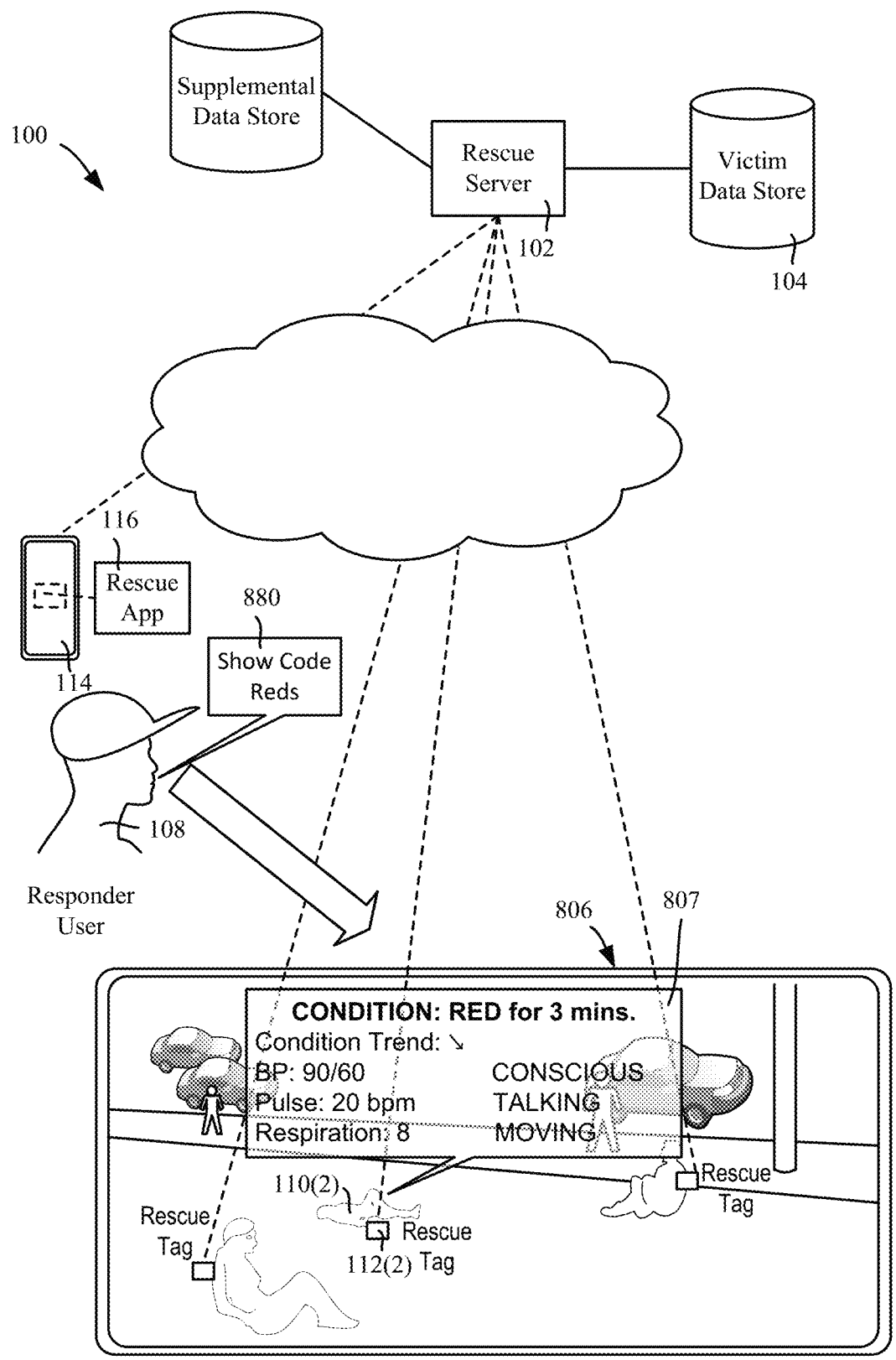
FIG. 8 is a block diagram of an example system and example representation of an augmented reality scene environment for presenting a responder with data of an included victim, via filtering, among multiple victims, in accordance with various aspects and embodiments of the subject disclosure.

In one embodiment, the augmented reality display may be presented using one or more filters to filter the presentation, and therefore what is displayed for each responder on the same scene may vary based on display requests sent from the responder to the server. For example, as shown in FIG. 8, a responder may request (block 880) presentation of the view 806 with augmented reality data (overlay 807) for only high priority ("Code Red") victims. Alternatively, a responder may, via filtering, see the augmented reality data of only those victims assigned to the responder, victims whose conditions are trending down, victims whose conditions are trending down quickly, or use other filtering to include certain victims and exclude others.

Figure 9:
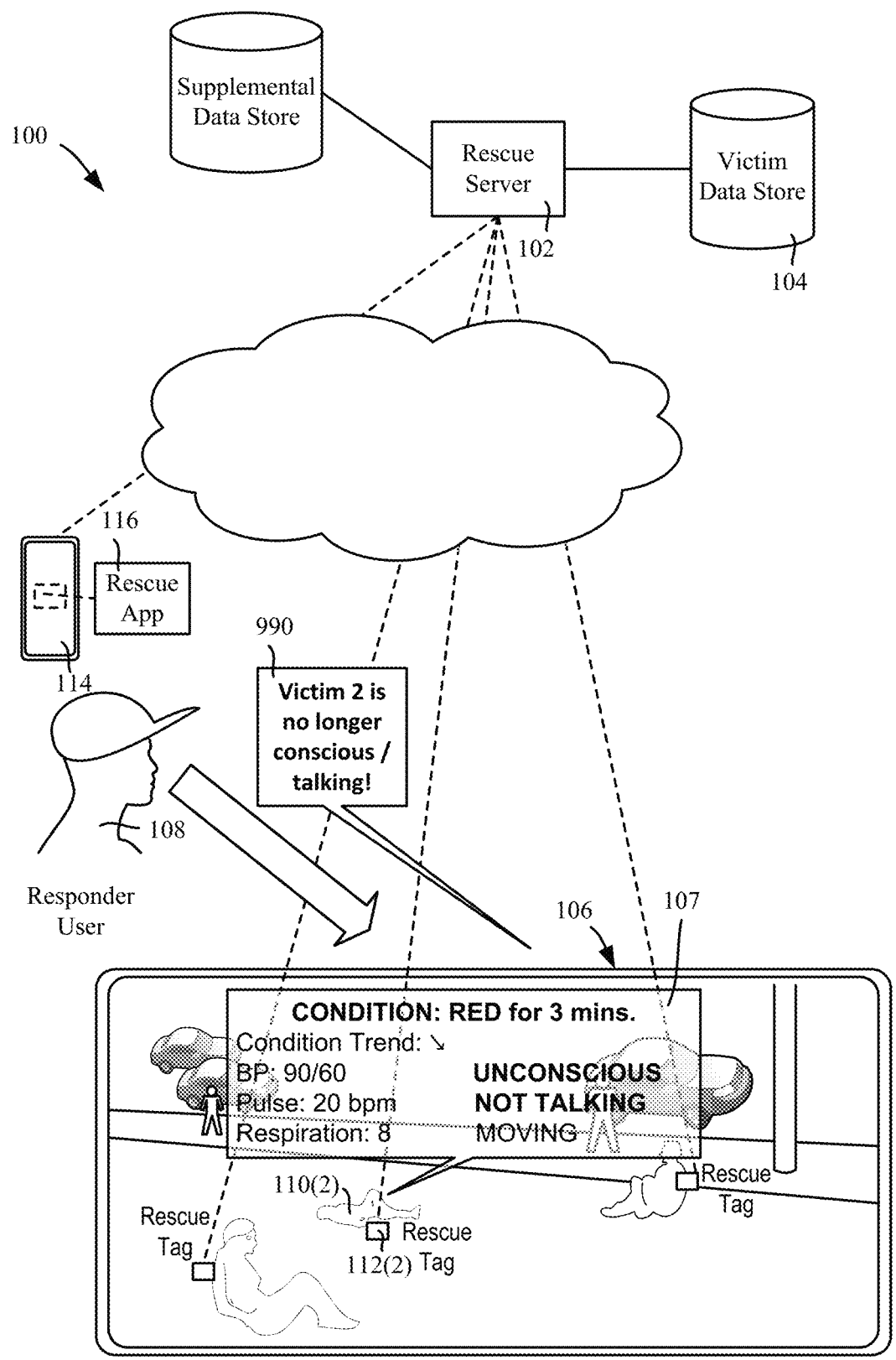
FIG. 9 is a block diagram of an example system and example representation of an augmented reality scene environment for presenting a responder with updated data of a victim based on change(s) in the victim's biological state data, in accordance with various aspects and embodiments of the subject disclosure.

The augmented reality display may also be used for the purpose of pushing alerts to the responder. Because the rescue tags frequently (e.g., generally continuously) can collect data and send the collected data to the victim data store 104, any changes in the data that constitute the need for an alert to the responder may be monitored by the rescue server 102. Such a change in data may be detected and the rescue server may send an alert to one or more responders on the scene, based on their location proximity to the affected victim. The alert may be represented as an augmented display relevant to the victim to whom the alert applies. For example, in FIG. 9, the overlay 907 of the view 906 has been updated to indicate that the victim 110(2) is no longer conscious or talking. This can be highlighted in some way, and/or in the example of FIG. 9, can be audibly output (block 990) as data to the responder user(s).

Figure 10:
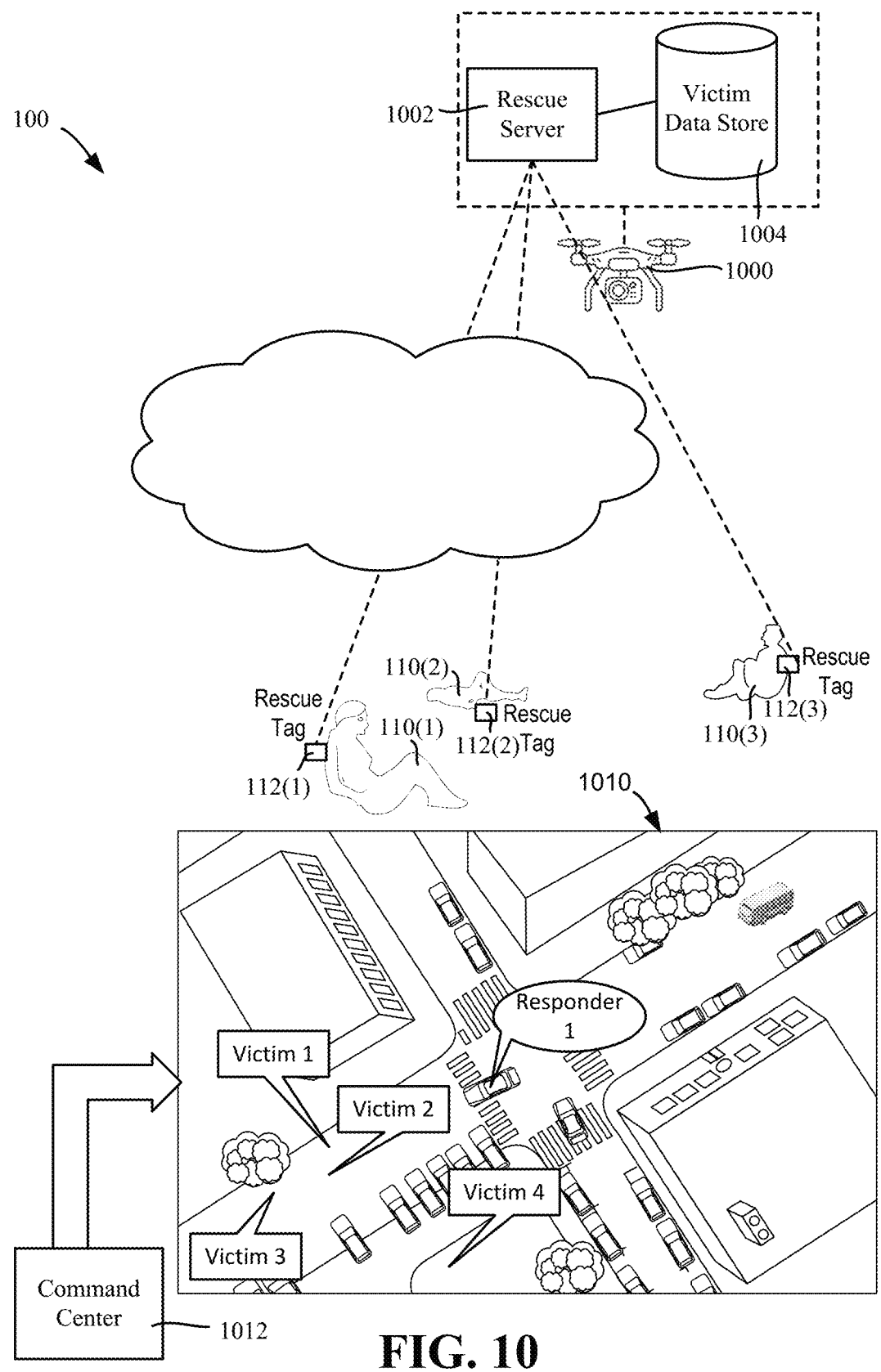
FIG. 10 is a block diagram of an example system and example representation of collective scene mapping captured via an elevated camera and augmented with information based on rescue tagging, in accordance with various aspects and embodiments of the subject disclosure.

In another embodiment generally represented in FIG. 10, an aerial vehicle 1000 (e.g., unmanned, such as a drone) may be deployed as a mobile edge node to the event scene to serve as a remote rescue server and data store. This (typically) unmanned aerial vehicle may serve in this role for the duration of the rescue event and may provide for quicker and more efficient data collection and communication within the event scene, by avoiding network latency or other delays in vital communications. The unmanned aerial vehicle 1000 may be deployed, for example, by the first responder upon their arrival, or in advance such as at the time the event is detected.

As also shown via the example scene 1010 of FIG. 10, an option exists for the presentation of an overview of an entire scene, for instance, using live video from the deployed unmanned aerial vehicle or other high elevation camera, with the rescue server 102 overlaying a display of victims' status, data, and responder assignment. This capability may be retrieved and presented to a command center 1012, for example, to assist in their management of the event.

Figure 11:
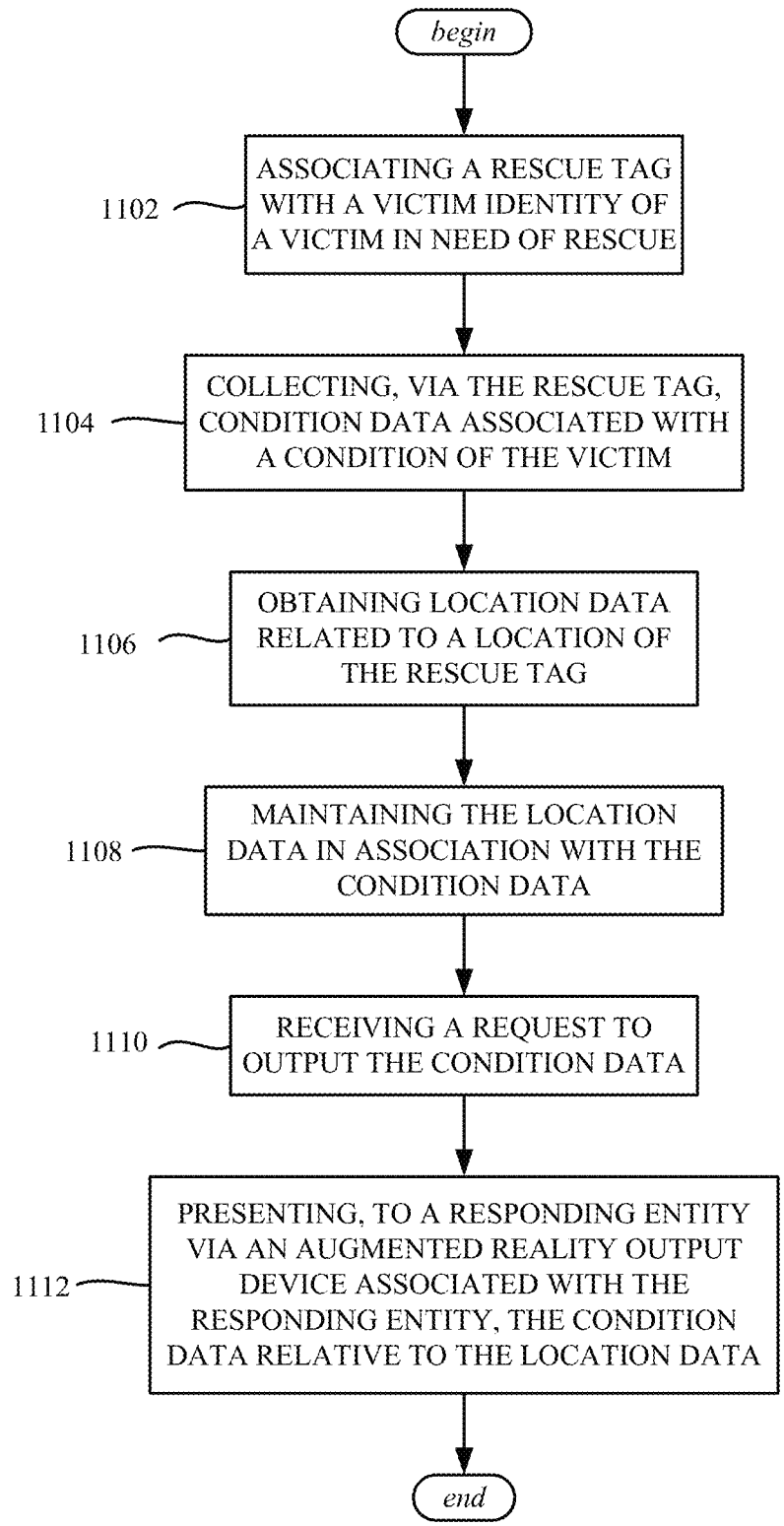
FIG. 11 is a flow diagram representing example operations related to presenting condition data of a rescue-tagged victim relative to the location data, in accordance with various aspects and embodiments of the subject disclosure.

One or more example aspects are represented in FIG. 11, and can correspond to a system, including a processor, and a memory that stores executable instructions that, when executed by the processor, facilitate performance of operations. Example operation 1102 represents associating a rescue tag with a victim identity of a victim in need of rescue. Example operation 1104 represents collecting, via the rescue tag, condition data associated with a condition of the victim. Example operation 1106 represents obtaining location data related to a location of the rescue tag. Example operation 1108 represents maintaining the location data in association with the condition data. Example operation 1110 represents receiving a request to output the condition data. Example operation 1112 represents presenting, to a responding entity via an augmented reality output device associated with the responding entity, the condition data relative to the location data.

The rescue tag, which can be considered a device, can include a medical sensor applied to the victim.

The rescue tag can include a user device coupled to the victim.

Further operations can include activating the rescue tag based on detection of an event. Further operations can include initiating a communication, based on the detection of the event, between the victim and the responding entity via respective devices of the victim and the responding entity.

Further operations can include detecting a change to the condition data, and outputting an alert based on the detecting of the change to the condition data.

The augmented reality output device can include a display device, and wherein a size of an available area for a display via the augmented reality display device is determined based on the condition data.

The rescue tag can monitor and collect ambient condition data representative of an ambient condition proximate to the victim, the ambient condition data comprising at least one of: temperature data representative of an ambient temperature proximate to the victim, moisture level data representative of an ambient moisture proximate to the victim, noise level data representative of an ambient noise proximate to the victim, air quality level data representative of an ambient air quality condition proximate to the victim, ambient light level data representative of an ambient light condition proximate to the victim, or radiation level data representative of an ambient radiation condition proximate to the victim.

Collecting, via the rescue tag, the condition data of the victim can include sensing at least one of: blood pressure data representative of a blood pressure of the victim, body temperature data representative of a body temperature of the victim, perspiration level data representative of an amount of perspiration by the victim, electrocardiogram data representative of an electrocardiogram reading applicable to of the victim, pulse data representative of a pulse reading applicable to the victim, pulse oximeter data representative of a pulse oximeter reading applicable to the victim, or respiration data representative of a respiratory activity of the victim.

The rescue tag can include or be coupled to at least one of: a microphone for capture of audio data, a camera for capture of at least one of video data or image data, a display for output of video communication data representative of a video communication in which at least one of the responding entity or the victim is participating, or a speaker for outputting audio communication data representative of an audio communication in which at least one of the responding entity or the victim is participating.

The victim may not be visible to the responding entity via a line of sight view by the responding entity; further operations can include determining a field of view of the responding entity with the location data, and outputting directionally informative assistance information to the responding entity via a device associated with the responding entity.

The victim can be part of a group of victims, and further operations can include filtering the condition data and the location data of the victim as part of presenting the condition data relative to the location data to the responding entity.

Further operations can include deploying an aerial vehicle toward at least one of the victim or the responding entity based on the location data.

The aerial vehicle can include a mobile edge node that serves as at least one of: a remote rescue server, or a remote data store.

The victim can be part of a group of victims, and the aerial vehicle can output respective identity data of respective victims of the group in conjunction with respective location data of the respective victims of the group.

Figure 12:
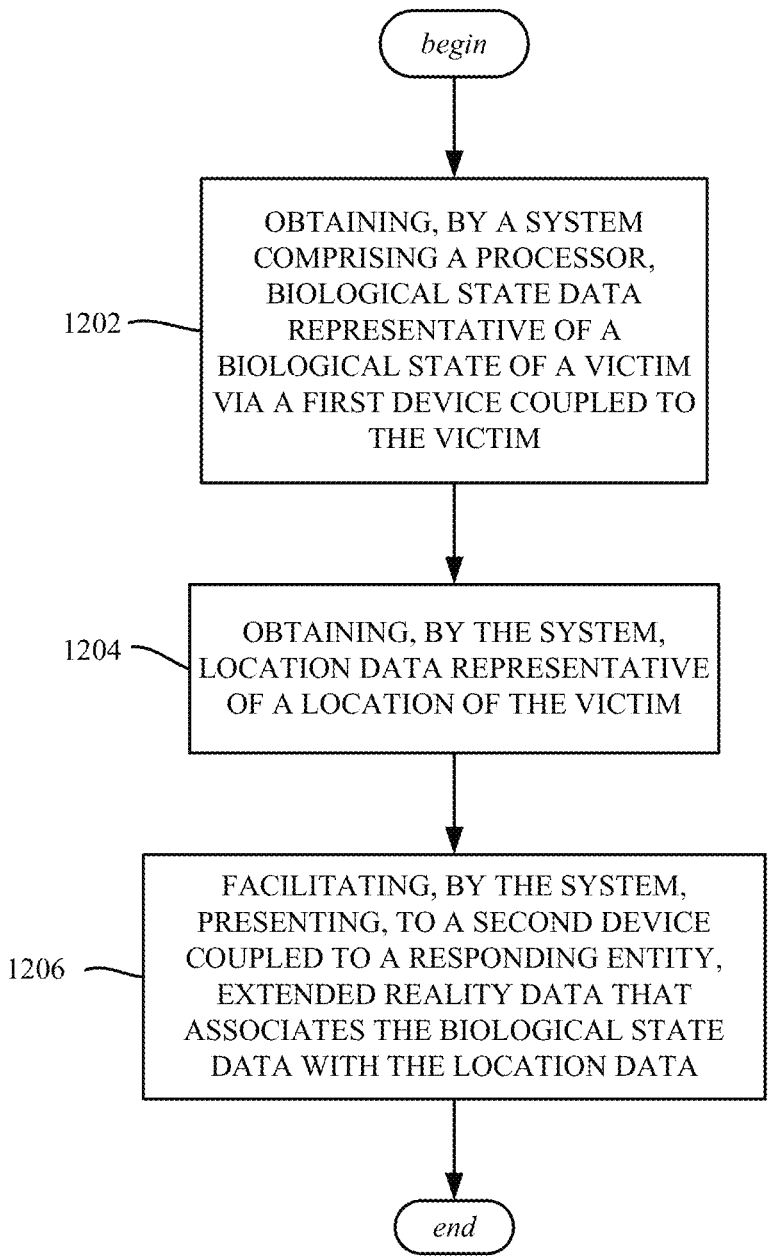
FIG. 12 is a flow diagram representing example operations related to obtaining biological state data of a victim for presenting the biological state data to a responding entity, in accordance with various aspects and embodiments of the subject disclosure.

One or more example aspects are represented in FIG. 12, and, for example, can correspond to operations, such as of a method. Example operation 1202 represents obtaining, by a system comprising a processor, biological state data representative of a biological state of a victim via a first device coupled to the victim. Example operation 1204 represents obtaining, by the system, location data representative of a location of the victim. Example operation 1206 represents facilitating, by the system, presenting, to a second device coupled to a responding entity, extended reality data that associates the biological state data with the location data.

The biological state data of the victim can be first biological state data, and further operations can include obtaining, by the system, second biological state data of the victim that is updated relative to the first biological state data, determining, by the system, that the second biological state data indicates a worsening condition of the victim relative to the first biological state data, and, in response to the determining, outputting, by the system, a notification, to be rendered via the second device to the responding entity, indicative of the worsening condition.

Further operations can include communicating, by the system, information, via the system and the first device coupled to the victim, between the second device coupled to the responding entity and the first device coupled to the victim.

Figure 13:
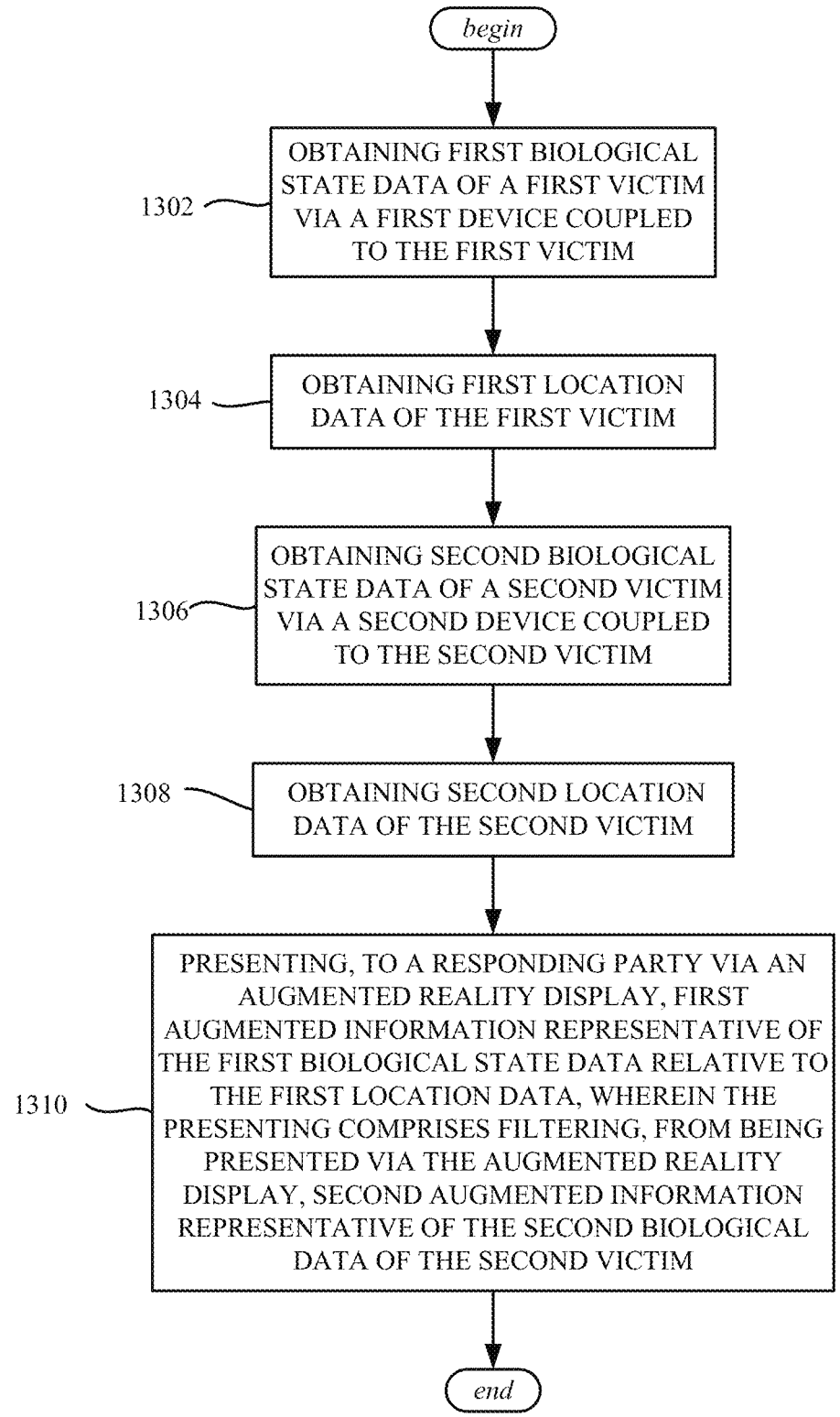
FIG. 13 is a flow diagram representing example operations related to obtaining condition data of rescue-tagged victims relative to the victims' locations, and based on filtering, presenting the condition data of one of the rescue-tagged victims to a responding entity, in accordance with various aspects and embodiments of the subject disclosure.

One or more aspects are represented in FIG. 13, such as implemented in a machine-readable medium, including executable instructions that, when executed by a processor, facilitate performance of operations. Example operation 1302 represents obtaining first biological state data of a first victim via a first device coupled to the first victim. Example operation 1304 represents obtaining first location data of the first victim. Example operation 1306 represents obtaining second biological state data of a second victim via a second device coupled to the second victim. Example operation 1308 represents obtaining second location data of the second victim. Example operation 1310 represents presenting, to a responding party via an augmented reality display, first augmented information representative of the first biological state data relative to the first location data, wherein the presenting comprises filtering, from being presented via the augmented reality display, second augmented information representative of the second biological data of the second victim.

The filtering can be performed based on at least one of: first biological state condition priority data representative of a first biological state condition priority of the first victim being determined to represent a higher priority for the first victim relative to second biological state condition priority data representative of a second biological state condition priority of the second victim, assignment data that indicates the responding party is assigned to the first victim and not assigned to the second victim, or first biological state condition data representative of a first biological condition of the first victim being determined to represent a faster worsening of biological condition relative to second biological state condition data representative of a second biological condition of the second victim.

As can be seen, the technology described herein facilitates an efficient way and rescue tag technology for responders, when responding to a scene, to readily understand the current condition status data and trending condition status data of the victim or victims on scene. The responder is quickly presented with data that describes the condition of each victim, including while traveling towards the victim, as soon as the victim is coupled to a rescue tag. The responder may also communicate with each victim as needed. The data collected during the period of victim assessment is recorded and is updated dynamically, with alerts presented as needed if the conditions change.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 14:
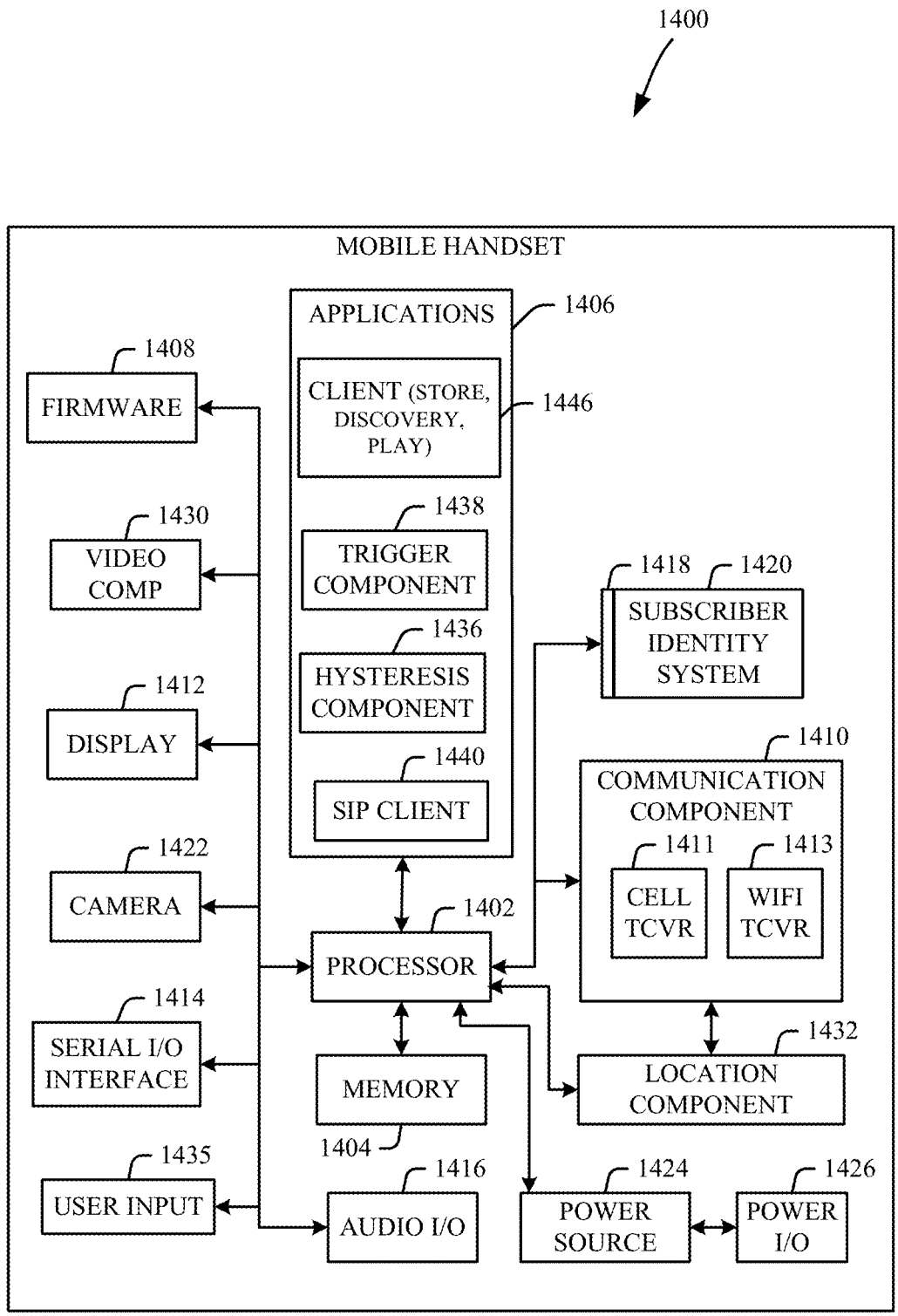
FIG. 14 illustrates an example block diagram of an example mobile handset operable to engage in a system architecture that facilitates wireless communications according to one or more embodiments described herein.

Referring now to FIG. 14, illustrated is a schematic block diagram of an example end-user device (such as user equipment) that can be a mobile device 1400 capable of connecting to a network in accordance with some embodiments described herein. Although a mobile handset 1400 is illustrated herein, it will be understood that other devices can be a mobile device, and that the mobile handset 1400 is merely illustrated to provide context for the embodiments of the various embodiments described herein. The following discussion is intended to provide a brief, general description of an example of a suitable environment 1400 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1400 includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1494) through a hard-wire connection, and other serial input devices (e.g., a keyboard, keypad, and mouse). This supports updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the handset 1400, and updated by downloading data and software.

The handset 1400 can process IP data traffic through the communication component 1410 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1422 (e.g., a camera) can be provided for decoding encoded multimedia content. The video processing component 1422 can aid in facilitating the generation, editing and sharing of video quotes. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1438 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 810, includes an indoor network radio transceiver 1413 (e.g., Wi-Fi transceiver). This function supports the indoor radio link, such as IEEE 802.11, for the dual-mode GSM handset 1400. The handset 1400 can accommodate at least satellite radio services through a handset that can combine wireless voice and digital radio chipsets into a single handheld device.

Figure 15:
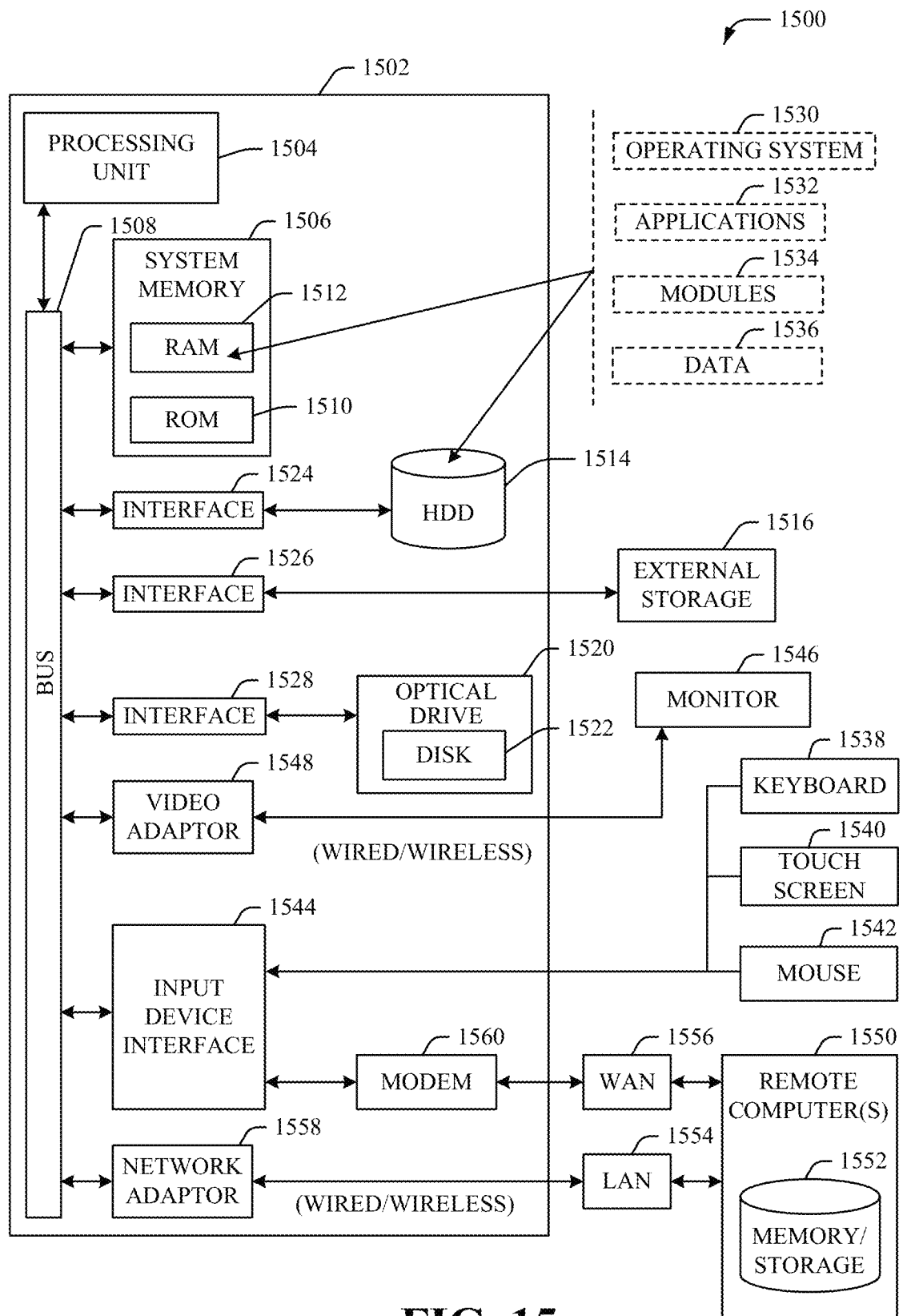
FIG. 15 illustrates an example block diagram of an example computer/machine system operable to engage in a system architecture that facilitates wireless communications according to one or more embodiments described herein.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD), non-volatile memory and other storage technology could be used in addition to, or in place of, an HDD 1514, and can be internal or external. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1494 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally include emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can include one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1494 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 15 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
a processor; and
a memory that stores executable instructions that, when executed by the processor of the system, facilitate performance of operations, the operations comprising:
associating a rescue tag with a victim identity of a victim in need of rescue;
collecting, via the rescue tag, condition data associated with a condition of the victim;
obtaining location data related to a location of the rescue tag;
maintaining the location data in association with the condition data;
receiving a request to output the condition data; and
presenting, to a responding entity via an augmented reality output device associated with the responding entity, the condition data relative to the location data,
wherein the augmented reality output device comprises a display device, and wherein a size of an available area for a display via the display device of the augmented reality output device is determined based on the condition data.

2. The system of claim 1, wherein the rescue tag comprises a medical sensor applied to the victim.

3. The system of claim 1, wherein the rescue tag comprises a user device coupled to the victim.

4. The system of claim 1, wherein the operations further comprise activating the rescue tag based on detection of an event.

5. The system of claim 4, wherein the operations further comprise initiating a communication, based on the detection of the event, between the victim and the responding entity via respective devices of the victim and the responding entity.

6. The system of claim 1, wherein the operations further comprise detecting a change to the condition data, and outputting an alert based on the detecting of the change to the condition data.

7. The system of claim 1, wherein the augmented reality output device comprises a smartphone.

8. The system of claim 1, wherein the rescue tag monitors and collects ambient condition data representative of an ambient condition proximate to the victim, the ambient condition data comprising at least one of: temperature data representative of an ambient temperature proximate to the victim, moisture level data representative of an ambient moisture proximate to the victim, noise level data representative of an ambient noise proximate to the victim, air quality level data representative of an ambient air quality condition proximate to the victim, ambient light level data representative of an ambient light condition proximate to the victim, or radiation level data representative of an ambient radiation condition proximate to the victim.

9. The system of claim 1, wherein the collecting, via the rescue tag, the condition data of the victim comprises sensing at least one of: blood pressure data representative of a blood pressure of the victim, body temperature data representative of a body temperature of the victim, perspiration level data representative of an amount of perspiration by the victim, electrocardiogram data representative of an electrocardiogram reading applicable to of the victim, pulse data representative of a pulse reading applicable to the victim, pulse oximeter data representative of a pulse oximeter reading applicable to the victim, or respiration data representative of a respiratory activity of the victim.

10. The system of claim 1, wherein the rescue tag comprises at least one of:
a microphone for capture of audio data, a camera for capture of at least one of video data or image data, a display for output of video communication data representative of a video communication in which at least one of the responding entity or the victim is participating, or a speaker for outputting audio communication data representative of an audio communication in which at least one of the responding entity or the victim is participating.

11. The system of claim 1, wherein the victim is not visible to the responding entity via a line of sight view by the responding entity, and wherein the operations further comprise determining a field of view of the responding entity with the location data, and outputting directionally informative assistance information to the responding entity via a device associated with the responding entity.

12. The system of claim 1, wherein the victim is part of a group of victims, and wherein the operations further comprise filtering the condition data and the location data of the victim as part of presenting the condition data relative to the location data to the responding entity.

13. The system of claim 1, wherein the operations further comprise deploying an aerial vehicle toward at least one of the victim or the responding entity based on the location data.

14. The system of claim 13, wherein the aerial vehicle comprises a mobile edge node that serves as at least one of: a remote rescue server, or a remote data store.

15. The system of claim 13, wherein the victim is part of a group of victims, and wherein the aerial vehicle outputs respective identity data of respective victims of the group in conjunction with respective location data of the respective victims of the group.

16. A method, comprising:
obtaining, by a system comprising a processor, biological state data representative of a biological state of a victim via a first device coupled to the victim, wherein the victim is part of a group of victims;
obtaining, by the system, location data representative of a location of the victim;
maintaining, by the system, the location data in association with the biological state data;
receiving, by the system, a request to output the biological state data;
facilitating, by the system, presenting, to a second device coupled to a responding entity, extended reality data that associates the biological state data with the location data; and
deploying an aerial vehicle toward at least one of the victim or the responding entity based on the location data, wherein the aerial vehicle outputs respective identity data of respective victims of the group of victims in conjunction with respective location data of the respective victims of the group.

17. The method of claim 16, wherein the biological state data of the victim is first biological state data, and further comprising obtaining, by the system, second biological state data of the victim that is updated relative to the first biological state data, determining, by the system, that the second biological state data indicates a worsening condition of the victim relative to the first biological state data, and, in response to the determining, outputting, by the system, a notification, to be rendered via the second device to the responding entity, indicative of the worsening condition.

18. The method of claim 16, further comprising communicating, by the system, information, via the system and the first device coupled to the victim, between the second device coupled to the responding entity and the first device coupled to the victim.

19. A non-transitory machine-readable medium, comprising executable instructions that, when executed by a processor, facilitate performance of operations, the operations comprising:
obtaining first biological state data of a first victim via a first device coupled to the first victim;
obtaining first location data of the first victim;
obtaining second biological state data of a second victim via a second device coupled to the second victim;
obtaining second location data of the second victim; and
presenting, to a responding party via an augmented reality display, first augmented information representative of the first biological state data relative to the first location data, wherein the presenting comprises filtering, from being presented via the augmented reality display, second augmented information representative of the second biological state data of the second victim, wherein the filtering is performed based on at least one of: first biological state condition priority data representative of a first biological state condition priority of the first victim being determined to represent a higher priority for the first victim relative to second biological state condition priority data representative of a second biological state condition priority of the second victim, assignment data that indicates the responding party is assigned to the first victim and not assigned to the second victim, or first biological state condition data representative of a first biological condition of the first victim being determined to represent a faster worsening of biological condition relative to second biological state condition data representative of a second biological condition of the second victim.

20. The non-transitory machine-readable medium of claim 19, wherein a size of an available area for the augmented reality display is determined based on the first biological state data of the first victim.

* * * * *